Figure 1:
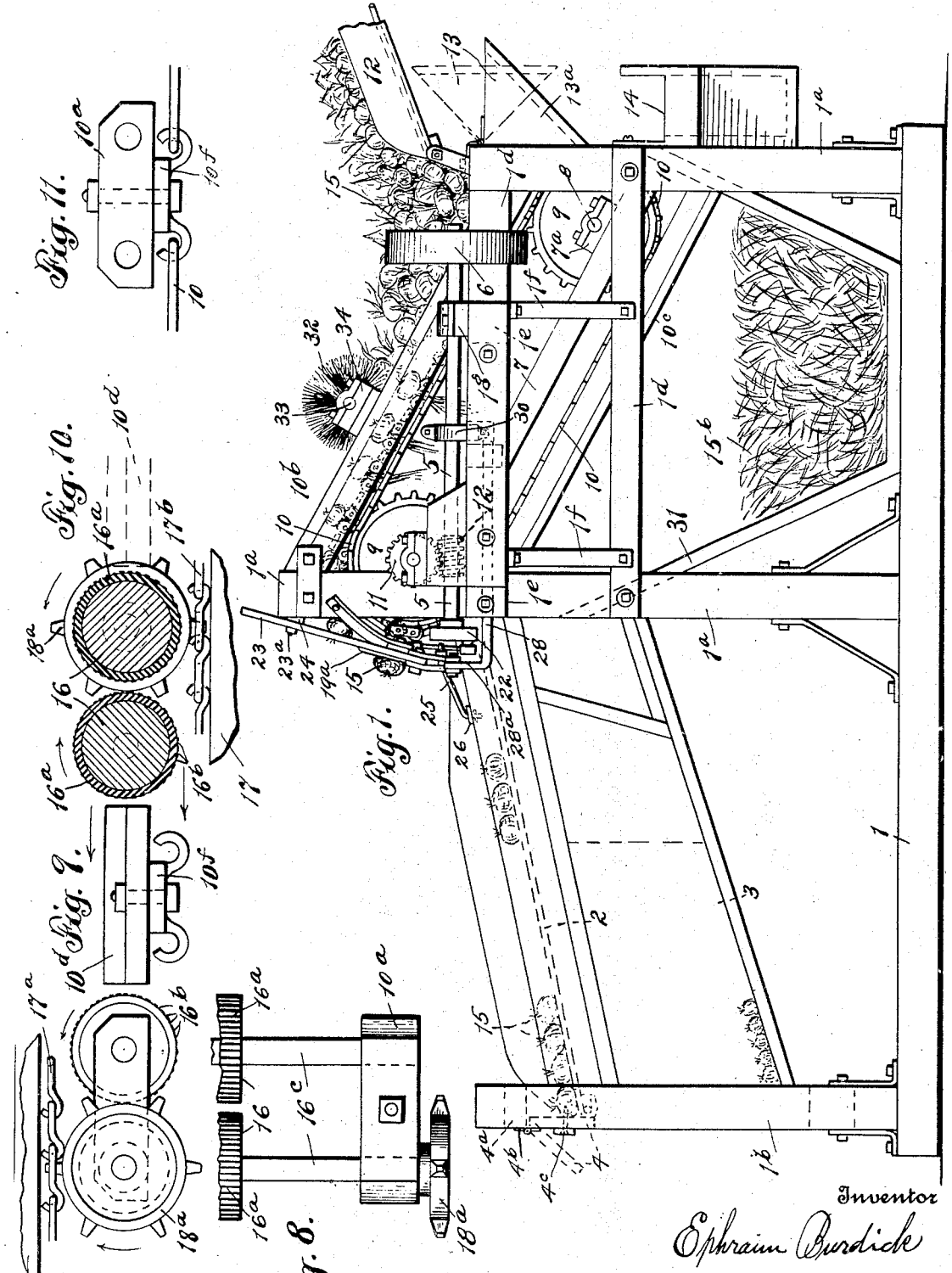

April 1, 1924.

E. BURDICK

VEGETABLE TOPPING MACHINE

Filed April 18, 1922    4 Sheets-Sheet 3

1,489,061

Inventor
Ephraim Burdick

By
Attorney

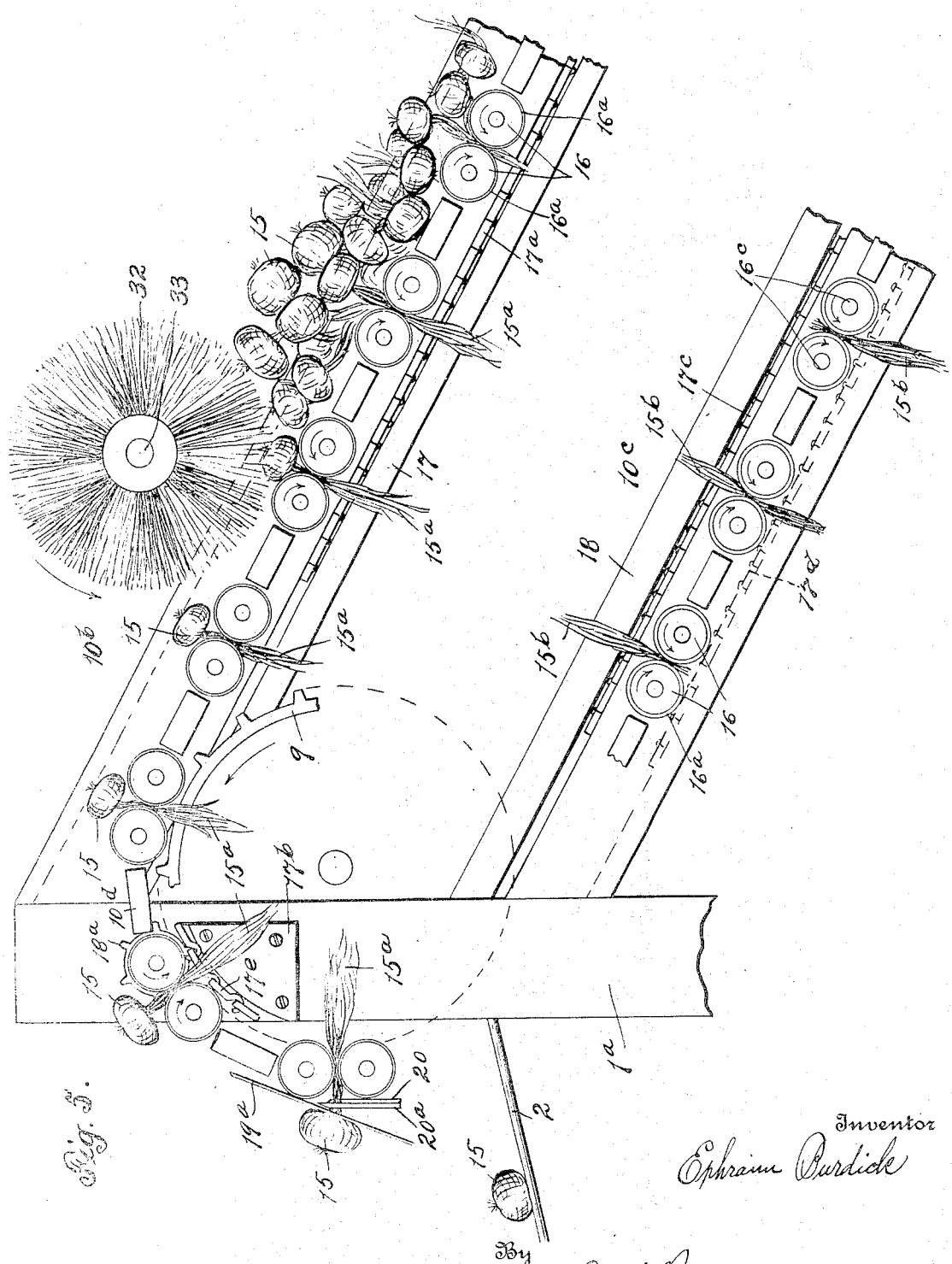

Patented Apr. 1, 1924.

1,489,061

UNITED STATES PATENT OFFICE.

EPHRAIM BURDICK, OF MADISON, OHIO, ASSIGNOR OF ONE-HALF TO ULYSSES A. EATO, OF CLEVELAND, OHIO.

VEGETABLE-TOPPING MACHINE.

Application filed April 18, 1922. Serial No. 554,780.

*To all whom it may concern:*

Be it known that I, EPHRAIM BURDICK, a citizen of the United States, residing at Madison, in the county of Lake and State of Ohio, have invented certain new and useful Improvements in Vegetable-Topping Machines, of which the following is a specification.

My invention relates to improvements in vegetable topping machines, and more particularly to that class or type especially designed and adapted for use in quickly and effectively removing tops from vegetables of varying forms, as for example, onions, beets, carrots, and the like.

The present embodiment of the invention is particularly designed and adapted for use in automatically feeding, topping and sorting such vegetables as onions, the improved machine being adapted to feed and top onions of widely varying forms and sizes with equal facility, and after the vegetables are topped to effectively sort out the smaller or "pickler" onions, the sorted onions being adapted to be deposited in separate receptacles or places of deposit for such purpose and the tops of the vegetables being discharged into a separate hopper or receptacle.

The primary object of the invention is to provide a generally improved power topping machine of the class mentioned having an endless conveyer having one of its passes inclined in the direction of its travel and provided with transversely extending vegetable top engaging rollers arranged in pairs, together with means for causing said pairs of rollers to revolve toward each other at their tops to engage the tops and thereby hold the vegetables as the latter are carried over said inclined pass together with means for disengaging or severing the tops from the vegetables at a predetermined point in the path of travel of said endless conveyer.

A still further object is the provision of an improved intercepting element mounted in cooperative relation to the inclined pass of the endless conveyer and adapted to intercept any vegetables whose tops are not engaged by the pairs of top engaging rollers as the latter are moved by the conveyer.

A still further object is the provision of means for reversing the direction of travel of the pairs of top engaging rollers when the tops are severed from the vegetables whereby the severed tops still in engagement with the rollers will be discharged or ejected from the latter into a suitable hopper or other place of deposit for the severed tops.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in some of its embodiments in the accompanying drawings and particularly pointed out in the appended claims.

Referring to the drawings, forming a part of this specification, Fig. 1 is a side elevation of a vegetable topping machine constructed in accordance with this invention, and in use as an onion topping machine.

Figure 2:
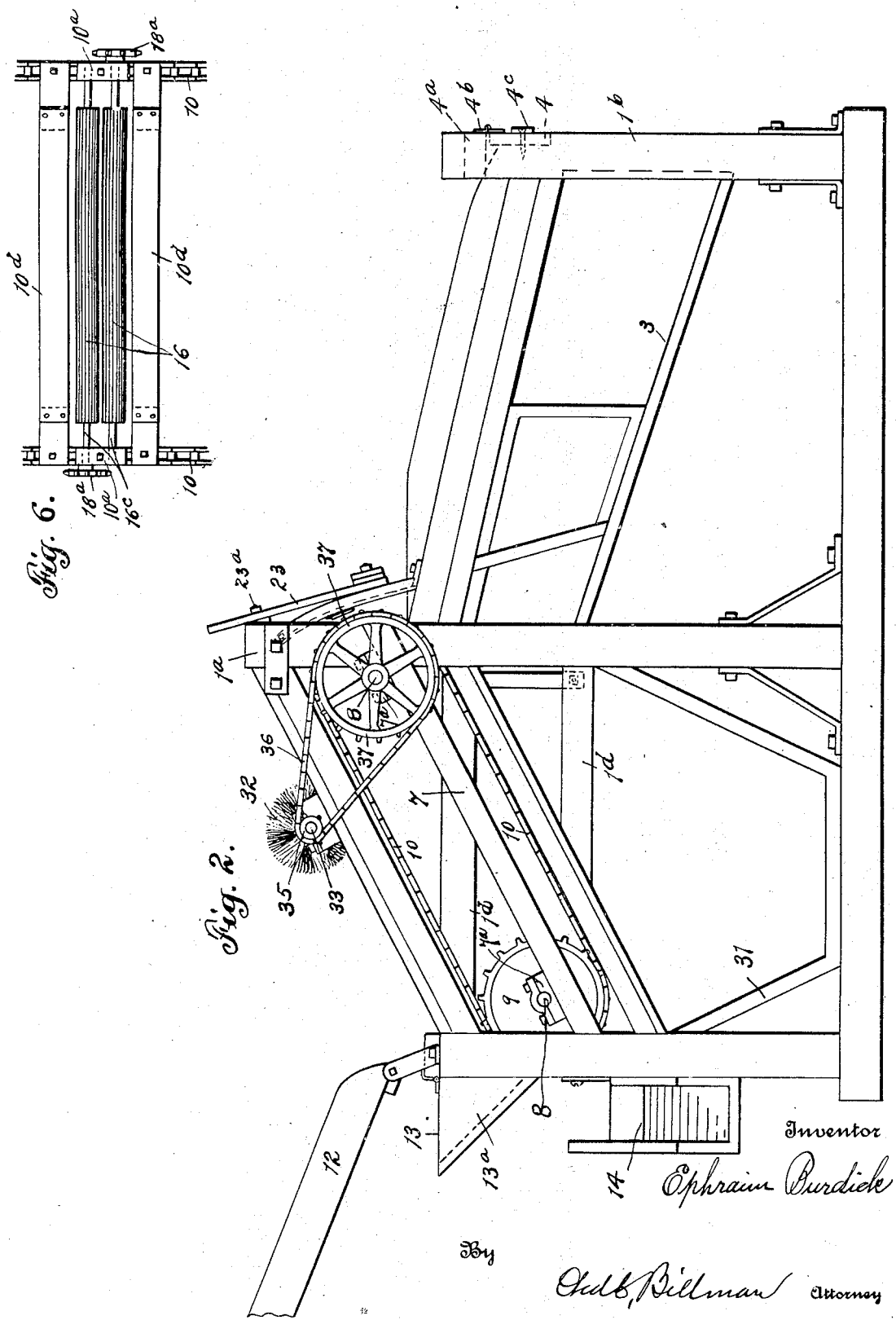

Fig. 2, a side elevation of the reverse side of the machine.

Figure 3:
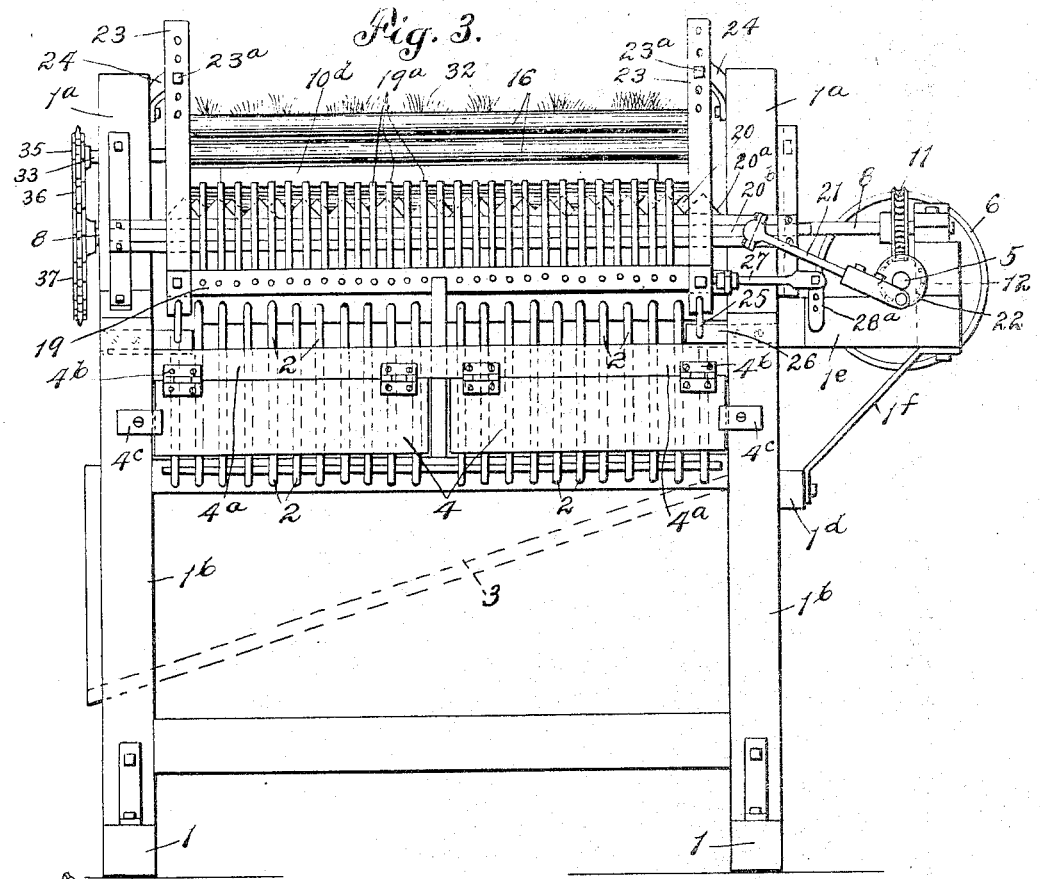

Fig. 3, an end view of the delivery portion or vegetable topping and sorting end of the machine.

Figure 4:
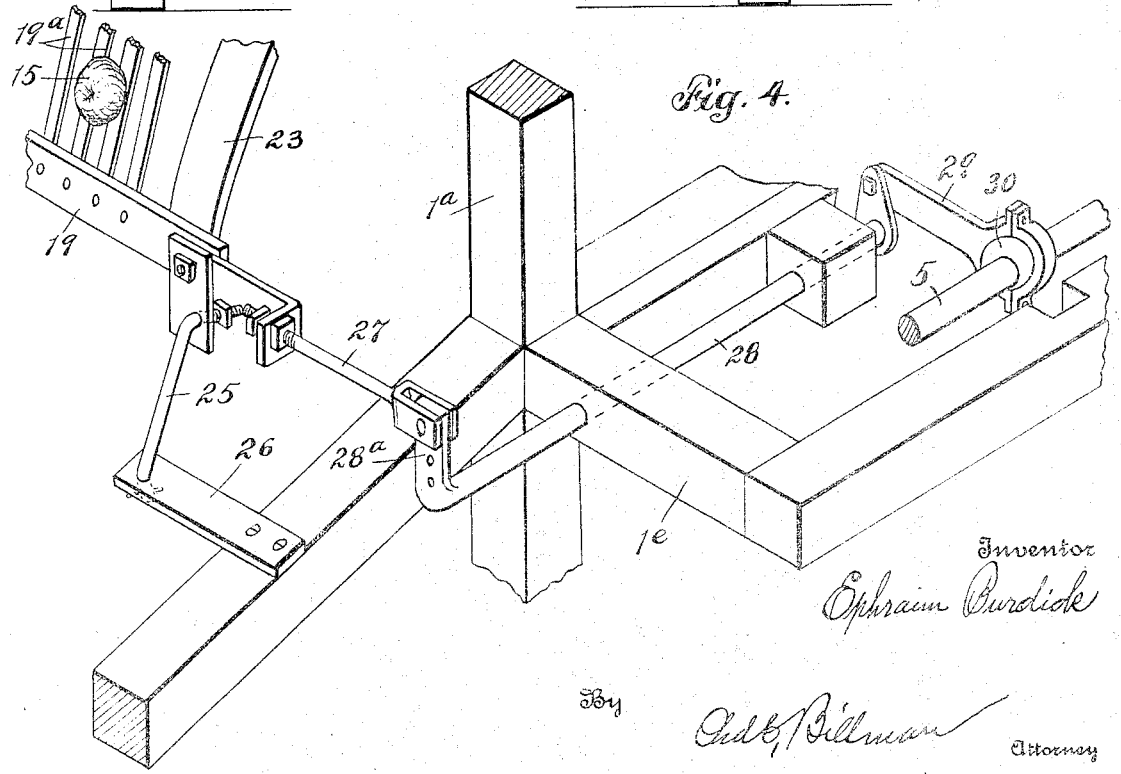

Fig. 4, an enlarged perspective view of the reciprocatory vegetable engaging cutter guards and means for reciprocating the same.

Fig. 5, an enlarged side elevation of the endless conveyer and vegetable top engaging rollers thereof, together with means for causing said rollers to revolve toward and from each other in pairs in different passes of the conveyer to engage and disengage the tops as the latter are held and moved toward and away from the top severing means, the action of the rollers and top severing mechanism being particularly illustrated.

Fig. 6, a fragmentary top plan view of the endless conveyer, and illustrating in particular the arrangement of the vegetable top engaging rollers in pairs and the roll gears or sprockets for driving the same in different passes or portions of travel of the endless conveyer.

Fig. 7, a fragmentary end elevation of a pair of vegetable top engaging rollers, illustrating the arrangement of the driving rack and gears on the near side of the same.

Fig. 8, a fragmentary top plan view of one end of the same, and illustrating in particular one of the bearing links of the endless conveyer for supporting the shaft or trunnion ends of the rollers.

Fig. 9, an end view of one of the cross carrier slats or members arranged, in the present instance, intermediate each pair of vegetable top engaging rollers.

Fig. 10, a cross sectional view of the same, illustrating the arrangement of the driving rack and gear on the far side of same.

Fig. 11, a detailed end view of one of the bearing links of the endless conveyer, detached from the bearing ends of the vegetable top engaging rollers.

Similar numerals of reference designate like parts throughout all the figures of the drawings.

The improved machine comprises a suitable frame consisting, in the present instance, of suitable base frame members 1, provided with uprights 1ª, suitably connected and braced to form the main frame, and a second pair of uprights 1ᵇ, at the front connected by connecting members 1ᶜ, to form a support for the inclined onion sorter bars 2, and the laterally inclined chute or hopper 3, adapted to receive and discharge the smaller or "pickler" onions as the latter fall through the sorter bars 2. The topped onions accumulated above the sorter bars 2 may be controlled and discharged into a suitable receptacle or place of deposit through the medium of the doors 4, hinged on the cross member 4ª, by means of hinges 4ᵇ, the doors being adapted to be closed by means of the buttons 4ᶜ.

The uprights 1ª of the main frame are provided with side bars 1ᵈ, and projecting bars 1ᵉ, suitably braced by means of the brace members 1ᶠ, said laterally projecting bars 1ᵉ being provided with bearing blocks 1ᵍ, adapted to carry a driving shaft 5, provided, in the present instance, with a pulley 6, adapted to be driven by a belting communicating with a suitable source of power. The main frame also includes inclined side members 7, adapted to support cross shafts 8, in bearing blocks 7ª, each shaft 8 being provided with a pair of sprocket wheels 9, adapted to support and drive an endless conveyer chain 10, the latter being made up of a suitable number of links 10 and intermediate bearing links 10ª.

Motion is transmitted to the upper cross shaft 8 through the medium of a worm gear 11, meshing with a worm 12, on the driving shaft 5.

It will be seen that the upper pass 10ᵇ of the endless conveyer is inclined upwardly in the direction of its travel and as a means of delivering the vegetables to be topped to the lower portion of the upper inclined path of the endless conveyer provided with vegetable top engaging rollers, as hereinafter referred to, a hopper 12, may be provided at the rear, and at the rear of the upper pass of the conveyer a pivoted or hinged hopper 13, is preferably provided, said hopper 13 being made up of the inclined member and the end members 13ª, so that any refuse material such as defective vegetables and foreign substances such as stones, sticks and trash of various kinds may be accumulated in such rear hopper and discharged at intervals into the laterally extending chute 14, by lifting the rear hopper 13 upwardly to the dotted line position shown in Fig. 1 of the drawings thereby discharging the material into the chute 14.

As a means of effectively feeding the vegetables 15, to the top detaching or severing means hereinafter referred to, and particularly as a means of holding and feeding such vegetables 15 only through the engagement of the tops 15ª thereof, and thereby carrying the vegetables 15 and tops 15ª in proper relative position to the topping means or device, the endless conveyer is provided with transversely extending vegetable top engaging rollers 16, arranged in pairs, said rollers 16, in the present instance, being provided with a covering of resilient material 16ª, having corrugations 16ᵇ, for assisting in causing the rollers 16 to more effectively engage the tops.

As a means of causing said pairs of rollers 16 to revolve towards each other at their tops as they pass upwardly on the inclined pass 10ᵇ, of the endless conveyer, the main frame is provided with inclined upper and lower pairs of bars 17 and 18, respectively, said bars being provided with racks 17ª and 17ᵇ, 17ᶜ and 17ᵈ, arranged in different horizontal planes and on opposite sides of the upper and lower passes 10ᵇ and 10ᶜ, of the conveyer, said racks, in the present instance, being formed by means of relatively fixed sprocket chain links secured to the bars 17 and 18, as shown most clearly in Figs. 7 and 10 of the drawings.

Each roller is provided with an end bearing shaft or trunnion 16ᶜ, arranged in the bearing openings of the bearing links 10ª and each roller of each pair is provided at one end with a sprocket wheel or gear 18ª, adapted to be engaged and rotated through the rack links 17ª, 17ᵇ, 17ᶜ and 17ᵈ in the upper and lower passes of the conveyer when the latter is driven by the mechanism hereinbefore referred to. It will be seen that the sprocket wheels 18ª of each pair of rollers are alternately arranged so that the sprocket or gear 18ª on one side is engaged by one of the racks and the other on the opposite cooperating roll is engaged by the other rack so that as the conveyer moves upwardly over the inclined pass of the conveyer the vegetable top engaging rollers 16 rotate toward each other at their tops thereby engaging the tops of the vegetables with sufficient force to carry the bodies of the vegetables into engagement with the upper peripheries or surfaces of the rollers and hold the bodies of the vegetables in the channel portions of the rollers in transversely extending rows, the racks, however, preferably terminating before the upper portion of the inclined pass is reached, as shown most clearly in Fig. 5 of the drawings, so that after being once engaged, and after passing the improved intercepting element, hereinafter referred to, for returning any unengaged vegetables, the vegetables will pass freely until just before being fed into the top severing device when a second pair of segmental racks 17$^e$, mounted on brackets 17$^b$, (see Fig. 5) will cause a final turning movement of the rollers toward each other to finally seat the vegetables in the channels of the rollers, the latter, however, being again left free for independent positioning and movement of the vegetables as the latter are passed between the fingers 19$^a$, of the vegetable engaging cutter guard arranged in front of and inclined over the vegetable top severing device consisting, in the present instance, of relatively fixed and movable members 20 and 20$^a$, arranged in the form of knives adapted to give a shear or drawcut on the vegetable tops, the reciprocatory knives or members 20$^a$ being mounted on a bar 20$^b$, receiving its reciprocatory movement through the means of a connecting rod 21, connected to a pitman wheel 22, on the end of the driving shaft 5.

In the present instance a transverse slat 10$^d$, is arranged between the pairs of vegetable top engaging rollers 16 and is connected to the bearing links 10$^a$ by means of connecting links 10$^e$ and connecting clips 10$^f$.

The vegetable engaging cutter guard fingers 19$^a$, are arranged on a reciprocatory bar 19, carried by means of hangers 23, on adjustable bolts 23$^a$, in brackets 24.

The cutter bar 19 may also be connected to the side bars of the sorter frame by means of links 25, connected in relatively fixed brackets 26.

As a means of reciprocating the sorter bar 19 and upwardly extending fingers 19$^a$ carried thereby to effectively release the vegetables when the tops are severed therefrom by the top severing or cutting device, one end of the bar 19 is provided with a link 27, connected to an arm 28$^a$, of a rock shaft 28, carried in suitable bearings and connected to a second link 29, mounted on an eccentric 30, (see Fig. 4) of the main driving shaft 5.

As a means of causing the top engaging rollers 16 to be revolved in an opposite direction in the lower pass 10$^c$, or the return movement of the endless carrier, and thereby to discharge the severed tops therefrom at a predetermined place of deposit, the lower inclined bars 18 have their racks 17$^c$ and 17$^d$ transposed in an opposite arrangement to that shown in Figs. 7 and 10 of the drawings thereby causing said top engaging rollers 16 to be revolved away from each other on their under sides as they pass down the lower pass of the endless conveyer thereby discharging or ejecting the severed tops 15$^b$, below the conveyer, in the present instance, in a hopper 31, and thereby effectively clearing each set of rollers of all severed tops before the return to the upper inclined pass for re-engaging the vegetables through their tops and feeding such vegetables to the top severing device.

As a means of intercepting any unengaged vegetables as passed upwardly or fed on the inclined pass 10$^b$, a suitable intercepting element 32, is provided, said intercepting element, in the present instance, comprising a rotary brush mounted on a shaft 33, and adapted to revolve against the vegetables as the latter are moved upwardly on the inclined pass of the conveyer. The shaft 33 may be mounted in bearing blocks 34, of the upper inclined bars of the machine and motion may be transmitted thereto through the medium of a sprocket pinion or wheel 35, provided with a sprocket chain 36, the latter passing over a sprocket wheel 37, mounted on one end of the upper cross shaft 8 which is adapted to drive the endless conveyer through the upper sprocket wheels 9 carried thereby.

Having thus described one of the embodiments of my invention, without having attempted to set forth all the forms in which it may be made, or all the modes of its use, what I claim and desire to secure by Letters Patent is,—

1. In a vegetable topping machine having a conveyer including an inclined pass provided with means for engaging the tops and thereby holding the vegetables in predetermined positions as fed, and means for preventing the passage of untopped vegetables beyond a predetermined point of said inclined pass of said conveyer.

2. In a vegetable topping machine including a feed hopper, an endless conveyer having rollers arranged in pairs and adapted to move toward each other to engage the tops and hold the vegetables to be fed, and a rotary brush for intercepting any vegetables above said feed hopper whose tops are not engaged by said rollers.

3. In a vegetable topping machine, an endless conveyer including an inclined pass and having transverse rollers moving toward each other at their tops and engaging the tops and holding the vegetables as fed along said inclined pass, and means along said inclined pass for intercepting and preventing the feeding of any vegetables whose tops are not so engaged.

4. In a vegetable topping machine, a conveyer including an inclined pass and rollers arranged in pairs transversely, means for causing the rollers to rotate toward each other to engage the tops and hold the vegetables as fed up said inclined pass, and means along said inclined pass for intercepting and returning any unengaged vegetables on said conveyer.

5. In a vegetable topping machine, a conveyer including transverse rollers arranged in pairs and having an inclined pass, means for causing the rollers of each pair to rotate toward each other in said inclined pass to engage the tops and hold the vegetables in predetermined positions and means for intercepting and returning any unengaged vegetables on said inclined pass of said conveyer.

6. In a vegetable topping machine, the combination with an endless conveyer provided with top engaging rollers, and means for driving said rollers and holding the vegetables and tops in predetermined positions; of means for severing the tops as held by said rollers, and reciprocatory vegetable engaging cutter guard fingers above said top severing means.

7. In a vegetable topping machine, including a cutting device, an endless conveyer including top engaging rollers, means for rotating the latter toward each other to finally position the vegetables to the cutting device, and means for releasing said rollers to provide for the independent handling of the vegetables as guided to the cutting device.

8. In a vegetable topping machine, an endless conveyer having one of its passes inclined upwardly in the direction of its travel, rollers carried by said conveyer in pairs; means for causing said rollers to revolve toward each other in pairs in said inclined pass to engage the tops and hold the vegetables to be fed, and means for feeding untopped vegetables to said conveyer.

9. In a vgetable topping machine, including a top severing device, an endless conveyer including top engaging rollers, means for actuating the latter to finally position the vegetables to said top severing device, and means for releasing said roller actuating device to provide for the independent handling of the vegetables as carried to the top severing device.

10. In a vegetable topping machine, the combination with a conveyer having one of its passes inclined upwardly in the direction of its travel and provided with means for engaging the tops and holding the vegetables in said inclined pass in predetermined positions for feeding, and means for preventing the feeding of any vegetables beyond a predetermined point of said inclined pass without their tops being engaged.

11. In a vegetable topping machine, in combination with an endless conveyer having an inclined pass and provided with top engaging means, means for actuating said top engaging means during such inclined pass for holding the vegetables and tops in predetermined positions, and means for severing the tops as held by said top engaging means.

12. A conveyer for vegetable topping machines, including a pass inclined upwardly in the direction of its travel, top engaging means carried by said conveyer, means for causing said top engaging means to be actuated to engage and hold said vegetables by their tops while passing upwardly on said inclined pass, and means for actuating said top engaging means for discharging the cut tops when severed from the vegetables.

13. In a vegetable topping machine, an endless conveyer having one of its passes inclined upwardly in the direction of its travel, rollers carried by said conveyer in pairs, means for causing said rollers of each pair to revolve to engage the tops and hold the vegetables to be fed as carried up said inclined pass, and means for revolving said rollers in an opposite direction to discharge the severed tops.

14. In a vegetable topping machine having a conveyer provided with an inclined pass and provided with means for engaging the tops and holding the vegetables in predetermined positions as fed up said inclined pass, and means for preventing the passage of untopped vegetables beyond a predetermined point of said inclined pass of said conveyer, and means for guiding said vegetables and severing the tops therefrom.

15. In a vegetable topping machine, in combination with a conveyer having one of its passes inclined upwardly in the direction of its travel and provided with means for engaging the tops and holding the vegetables in predetermined positions as carried up said inclined pass for feeding, means for feeding the vegetables at a predetermined point while their tops are engaged, and means for ejecting the cut tops from said top engaging means.

16. In a vegetable topping machine, an endless conveyer inclined in the direction of its travel and provided with transversely extending pairs of vegetable top engaging rollers, means for causing said pairs of rollers to revolve toward each other as they pass upwardly on said inclined pass of the conveyer, means for severing the tops from the vegetables as held by said rollers, and means for causing said pairs of rollers to revolve in an opposite direction to discharge the severed tops from said rollers.

17. In a vegetable topping machine, an endless conveyer inclined in the direction of its travel and provided with pairs of transversely extending vegetable top engaging rollers, means for causing said pairs of rollers to revolve toward each other to engage and hold the vegetables as the latter are carried over said inclined pass, an intercepting element for intercepting and returning any unengaged vegetables on said inclined pass of said conveyer, and means for severing the tops from said vegetables at a predetermined point in the path of travel of said conveyer.

18. In a vegetable topping machine, the combination with a conveyer carrying a series of transversely arranged vegetable engaging rollers arranged in pairs, means for rotating adjacent rollers of each pair toward each other at their tops to cause the same to snugly engage the tops of the vegetables as the latter enter the machine, means for intercepting any unengaged vegetables and returning the same to be engaged by said rollers, spaced fingers adapted to receive the vegetables as held by said rollers, means for cutting the tops from said vegetables, and means for causing said rollers to revolve in an opposite direction in the lower pass of said conveyer to discharge the cut tops therefrom.

19. In a vegetable topping machine, a frame, an endless conveyer having an upper inclined pass provided with transversely extending pairs of vegetable engaging rollers, means for causing said pairs of rollers to revolve toward each other on the upper pass of the said rollers and away from each other on the lower pass of said conveyer, means for delivering the vegetables to be topped to said upper inclined pass of said vegetable top engaging rollers, means for intercepting and returning any unengaged vegetables at a predetermined point on said inclined pass of vegetable top engaging rollers, means for severing the tops of the vegetables as held between said rollers, and means for driving said endless conveyer.

20. In a vegetable topping machine, a frame, an endless conveyer arranged in inclined relation and provided with a series of transverse vegetable top engaging rollers, means for causing said rollers to revolve toward each other in pairs as they pass over the upper pass of said endless conveyer and to revolve away from each other in pairs as they pass down the lower pass of said endless conveyer, means for delivering the vegetables to be topped to said upper inclined pass of the conveyer to cause the tops thereof to be engaged within said rollers, means for intercepting and returning any unengaged rollers at a predetermined point on said inclined pass of conveyer top engaging rollers, means for severing the tops from the vegetables as held between said rollers, and means for driving said conveyer for topping the vegetables.

In testimony whereof I hereby affix my signature.

EPHRAIM BURDICK.